United States Patent
Yoon et al.

(10) Patent No.: US 8,311,349 B2
(45) Date of Patent: Nov. 13, 2012

(54) DECODING IMAGE WITH A REFERENCE IMAGE FROM AN EXTERNAL MEMORY

(75) Inventors: Ki Wook Yoon, Seoul (KR); Soon Uk Kim, Gyeonggi-Do (KR)

(73) Assignee: Core Logic, Inc., Seoul (KR)

( * ) Notice: Subject to any disclaimer, the term of this patent is extended or adjusted under 35 U.S.C. 154(b) by 846 days.

(21) Appl. No.: 12/429,943

(22) Filed: Apr. 24, 2009

(65) Prior Publication Data

US 2009/0268972 A1 Oct. 29, 2009

(30) Foreign Application Priority Data

Apr. 25, 2008 (KR) .................. 10-2008-0038990

(51) Int. Cl.
*G06K 9/36* (2006.01)
(52) U.S. Cl. ......... 382/233; 382/236; 250/307; 250/311
(58) Field of Classification Search .................. 382/232, 382/233, 236; 250/307, 311
See application file for complete search history.

(56) References Cited

U.S. PATENT DOCUMENTS

| | | | | |
|---|---|---|---|---|
| 5,550,847 | A * | 8/1996 | Zhu ............................... | 714/748 |
| 6,366,705 | B1 * | 4/2002 | Chiu et al. .................... | 382/239 |
| 2005/0094729 | A1 * | 5/2005 | Yuan et al. ............... | 375/240.16 |
| 2005/0265450 | A1 * | 12/2005 | Raveendran et al. ..... | 375/240.15 |
| 2008/0095240 | A1 * | 4/2008 | Choi et al. ............... | 375/240.17 |

* cited by examiner

*Primary Examiner* — Chan S Park
*Assistant Examiner* — Eueng-Nan Yeh
(74) *Attorney, Agent, or Firm* — Nath, Goldberg & Meyer; Joshua B. Goldberg; Stanley N. Protigal

(57) ABSTRACT

Techniques, apparatus and systems for image decoding are described. A method performed by an image decoding apparatus includes generating motion compensation information and a quantized result of an error image that represents a difference between a current image to be decoded and a prediction image obtained by performing inter prediction on the current image from a bitstream of the current image. A reference image of the current image is received from an external memory unit based on the generated motion compensation information. The method includes restoring the current image based on the received reference image of the current image and the generated quantized result of the error image representing the difference between the current image and the prediction image. Receiving the reference image of the current image is performed while restoring a previous image, and restoring the current image is performed while receiving a reference image of a subsequent image.

20 Claims, 6 Drawing Sheets

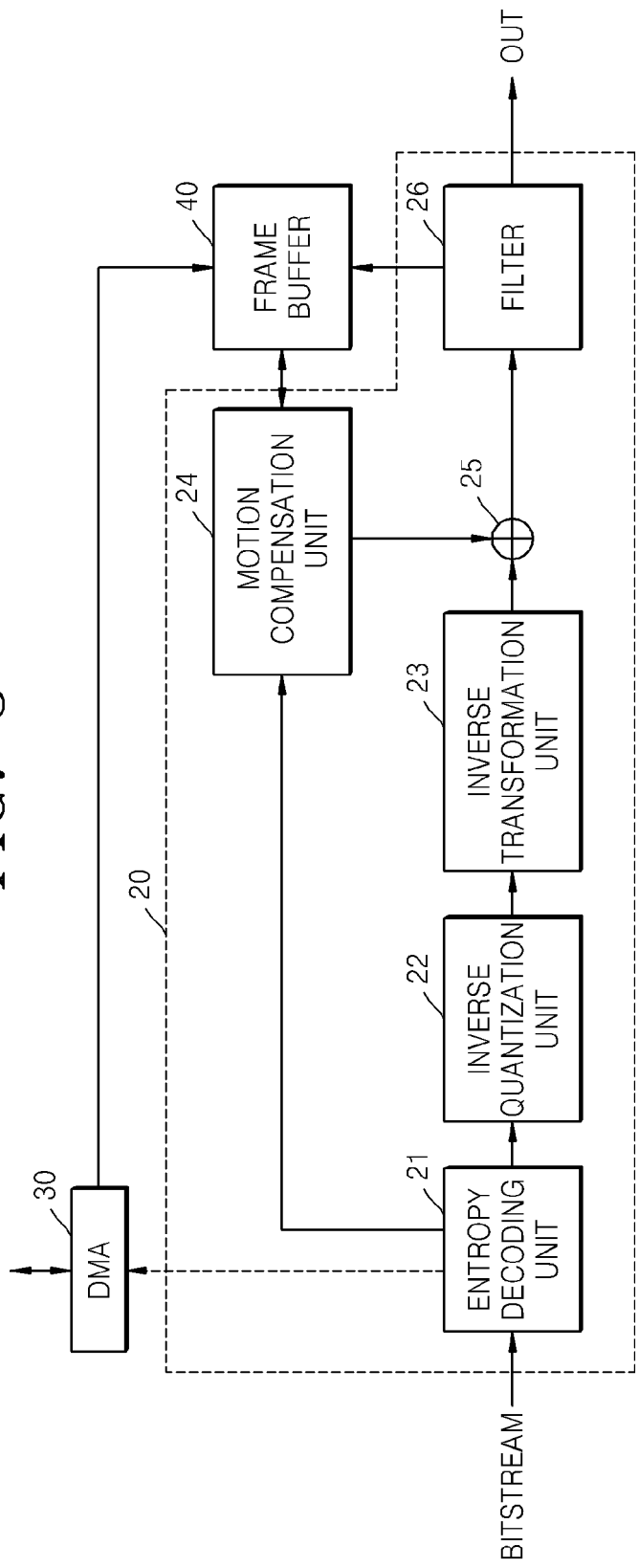
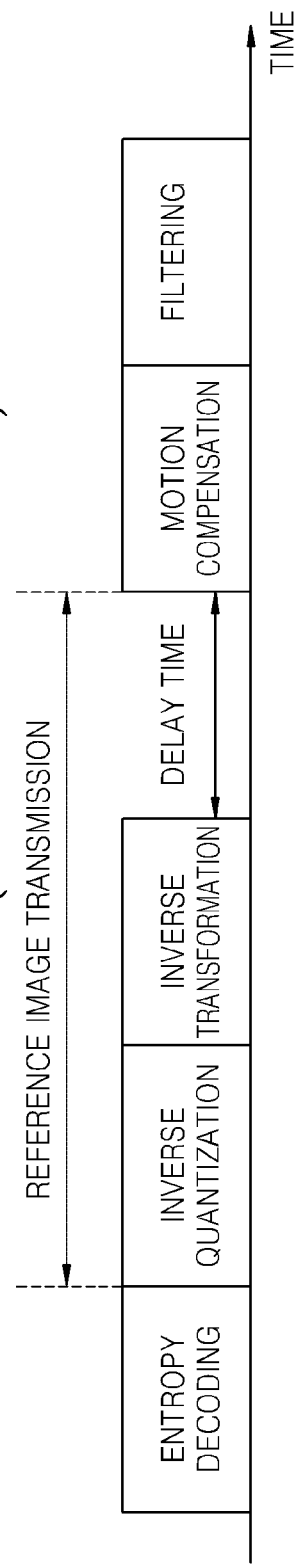
FIG. 3
FIG. 4 (RELATED ART)

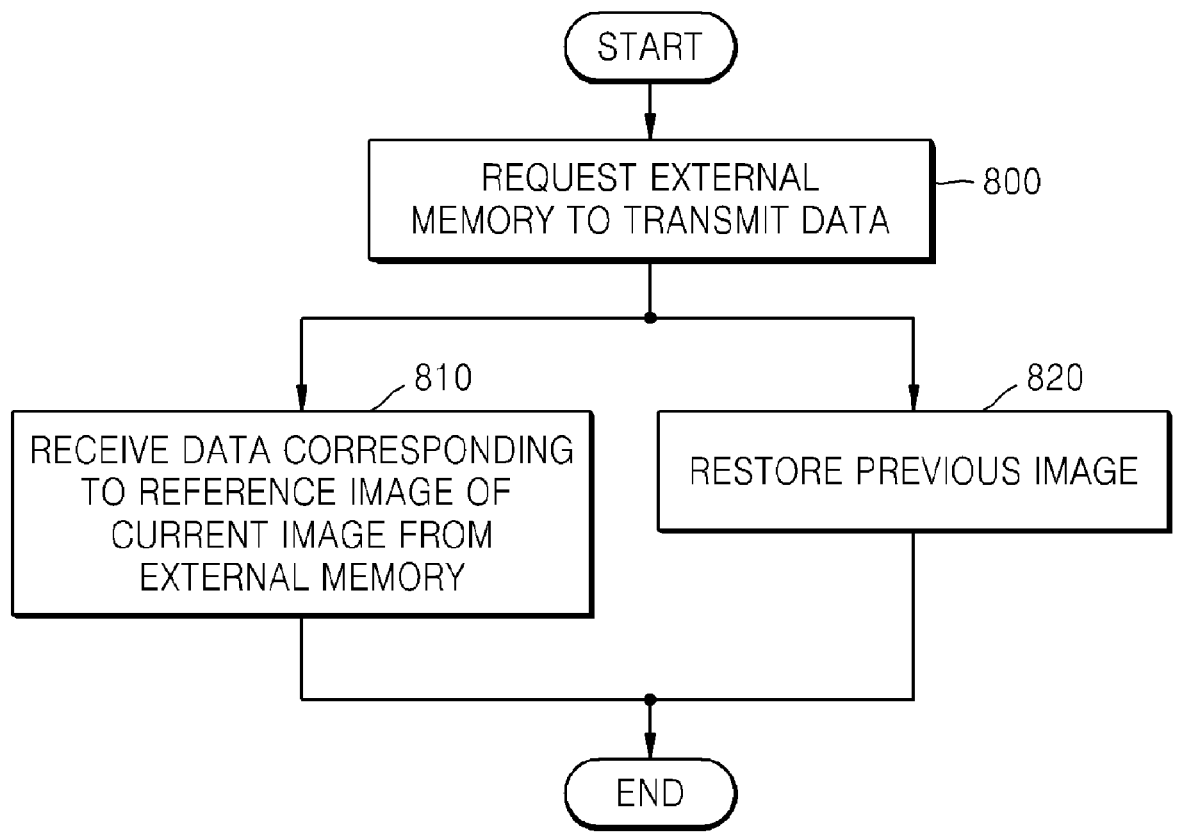

DECODING IMAGE WITH A REFERENCE IMAGE FROM AN EXTERNAL MEMORY

CLAIM OF PRIORITY

This application claims the benefit of Korean Patent Application No. 10-2008-0038990, filed on Apr. 25, 2008, in the Korean Intellectual Property Office, the disclosure of which is incorporated herein in its entirety by reference.

BACKGROUND

The disclosure relates to image decoding.

According to image compression standards such as the Moving Picture Experts Group (MPEG)-1, MPEG-2, and MPEG-4 H.264/MPEG-4 advanced video coding (AVC), in order to encode an image, a picture is divided into blocks of a predetermined size and each block is encoded by performing inter prediction or intra prediction. An optimal encoding mode is selected in consideration of a rate-distortion (R-D) cost and a block is encoded according to the selected encoding mode.

In an image encoding method using inter prediction, an image is compressed by removing temporal redundancy between pictures. A motion estimation encoding method is a representative example of the image encoding method using inter prediction. In the motion estimation encoding method, an image is encoded by estimating and compressing motion of a current picture in blocks by using at least one reference picture.

SUMMARY

In one aspect, a method performed by an image decoding apparatus includes generating motion compensation information and a quantized result of an error image that represents a difference between a current image to be decoded and a prediction image obtained by performing inter prediction on the current image from a bitstream of the current image. The method includes receiving a reference image of the current image from an external memory unit based on the generated motion compensation information. The method includes restoring the current image based on the received reference image of the current image and the generated quantized result of the error image representing the difference between the current image and the prediction image. Receiving the reference image of the current image is performed while restoring a previous image, and restoring the current image is performed while receiving a reference image of a subsequent image.

Implementations can optionally include one or more of the following features. Receiving the reference image of the current image can include requesting a direct memory access (DMA) apparatus to transmit the reference image of the current image from the external memory unit using an external system bus based on the generated motion compensation information; and receiving the reference image of the current image from the external memory unit and storing the reference image of the current image into an internal memory unit. Restoring the current image can include restoring the error image by inversely quantizing the generated quantized result and inversely transforming the inversely quantized result from a frequency space into a color space; restoring the prediction image by performing motion compensation on the current image based on the received reference image; and adding the restored error image to the restored prediction image. Restoring the current image can further include performing deblocking filtering on a result of the adding and outputting a result of filtering as the restored current image. At least the current image can correspond to one or more blocks of a predetermined size, and generating the motion compensation information and the quantized result, receiving the reference image of the current image, and restoring the current image can be performed a number of times corresponding to a number of the one or more blocks.

In another aspect, a computer readable medium is embodied with instructions to cause a data processing apparatus to perform an image decoding method that includes generating motion compensation information and a quantized result of an error image that represents a difference between a current image to be restored and a prediction image obtained by performing inter prediction on the current image from a bitstream of the current image. The instructions can cause a data processing apparatus to receive a reference image of the current image from an external memory unit by using the generated motion compensation information; and restore the current image based on the received reference image of the current image and the quantized result of the error image. Receiving the reference image of the current image can be performed while restoring a previous image, and restoring the current image is performed while receiving a reference image of a subsequent image. The instructions can cause a data processing apparatus to receive the reference image of the current image by requesting a direct memory access (DMA) apparatus to transmit the reference image of the current image from the external memory unit using an external system bus based on the generated motion compensation information; and receiving the reference image of the current image from the external memory unit and storing the reference image of the current image into an internal memory unit. The instructions can cause a data processing apparatus to restore the current image by restoring the error image by inversely quantizing the generated quantized result and inversely transforming the inversely quantized result from a frequency space into a color space; restoring the prediction image by performing motion compensation on the current image based on the received reference image; and adding the restored error image to the restored prediction image. The instructions can cause a data processing apparatus to restore the current image by performing deblocking filtering on a result of the adding and outputting a result of filtering as the restored current image. At least the current image can correspond to one or more blocks of a predetermined size. The instructions can cause a data processing apparatus to generate the motion compensation information and the quantized result, receive the reference image of the current image, and restore the current image a number of times corresponding to a number of the one or more blocks.

In another aspect, an image decoding apparatus includes an entropy decoding unit to generate motion compensation information and a quantized result of an error image representing a difference between a current image to be restored and a prediction image obtained by performing inter prediction on the current image by performing entropy decoding on a bitstream that is an encoded result of the current image. The image decoding apparatus includes an image restoring unit to receive a reference image of the current image from an external memory unit by using the generated motion compensation information and to restore the current image based on the received reference image and the quantized result. The image restoring unit is configured to restore a previous image while receiving the reference image of the current image, and receive the reference image of a subsequent image while restoring the current image.

Implementations can optionally include one or more of the following features. The image restoring unit can be configured to receive the reference image from the external memory unit using an external system bus by using the generated motion compensation information. The image restoring unit can include an inverse quantization unit to inversely quantize the quantized result; an inverse transformation unit to restore the error image by inversely transforming the inversely quantized result from a frequency space into a color space; a motion compensation unit to restore the prediction image by performing motion compensation on the current image based on the received reference image; and an adder to add the restored error image and the restored prediction image. The image restoring unit can further include a deblocking filter to perform deblocking filtering on a result of the adder and output a result of the deblocking filtered as the restored current image. At least the current image can correspond to one or more blocks of a predetermined size.

In another aspect, an image decoding system includes a memory unit to store reference images. The system includes an image decoding apparatus to communicate with the memory unit. The image decoding apparatus can generate motion compensation information and a quantized result of an error image representing a difference between a current image to be restored and a prediction image obtained by performing inter prediction on the current image by performing entropy decoding on a bitstream of the current image. The image decoding apparatus can receive at least one of the reference images from the memory unit by using the generated motion compensation information. The image decoding apparatus can restore the current image based on the at least one received reference image and the quantized result. The image decoding apparatus requests the memory unit to transmit the at least one of the reference images by using the motion compensation information, and receive the at least one of the reference images from the memory unit while restoring a previous image.

Implementation can optionally include one or more of the following features. The image decoding apparatus can include an entropy decoding unit to generate the motion compensation information and the quantized result by performing entropy decoding on a bitstream comprising an encoded result of the current image; an inverse quantization unit to inversely quantize the quantized result; an inverse transformation unit to restore the error image by inversely transforming the inversely quantized result from a frequency space into a color space; a motion compensation unit to restore the prediction image by performing motion compensation on the current image based on the at least one received reference image; and an adder to add the restored error image and the restored prediction image. The image decoding apparatus can include a deblocking filter to perform deblocking filtering on a result of the adder and output a result of the deblocking filter as the restored current image. At least the current image can correspond to one or more blocks of a predetermined size. The system can include a system bus connected between the memory unit and the image decoding apparatus. The image decoding apparatus can be configured to receive at least one of the reference images from the memory unit using the system bus.

The techniques, apparatus and systems described in this specification can optionally provide one or more of the following advantages. The described image decoding techniques, apparatus and systems are capable of reducing delay time of a decoding operation. Also, data transmission can be controlled between a memory unit and an image decoding apparatus capable of reducing delay time of a decoding operation.

BRIEF DESCRIPTION OF THE DRAWINGS

FIG. 3 is a block diagram of the decoding unit illustrated in FIG. 2, according to an embodiment of the present disclosure;

FIG. 4 is a diagram illustrating a conventional decoding operation order;

FIG. 8 is a flowchart illustrating a data transmission control method according to an embodiment of the present disclosure.

DETAILED DESCRIPTION

Figure 1:
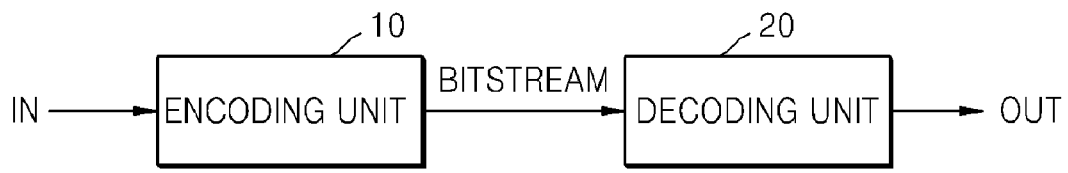
FIG. 1 is a schematic block diagram of an image processing system according to an embodiment of the present disclosure.

FIG. 1 is a schematic block diagram of an example image processing system according to an embodiment of the present disclosure. An image can include various data including a picture, a frame, etc. Referring to FIG. 1, the image processing system includes an encoding unit 10 and a decoding unit 20. For the example shown in FIG. 1, the size of a block, i.e., the unit of processing an image, is 16×16. A 16×16 block is referred to as a macroblock. However, it will be understood by one of ordinary skill in the art that the size of a block can include other sizes, such as 16×8, 8×16, 8×8, and 4×4 as well as 16×16.

The encoding unit 10 generates a bitstream by encoding an input image, IN, and transmits the generated bitstream to the decoding unit 20. The input image, IN, may be an image represented in the Red-Green-Blue (RGB) color space or may be an image represented by separating a luminance component Y from chrominance components Cb and Cr. Also, the input image, IN, may include multiple frames arranged in a temporal order.

The decoding unit 20 decodes the bitstream received from the encoding unit 10 and outputs a decoded or restored image, OUT. If the encoding unit 10 performs lossless compression on the input image, IN, the restored image OUT should be identical to the input image, IN. Meanwhile, if the encoding unit 10 performs lossy compression on the input image, IN, the restored image, OUT is similar but not identical to the input image, IN.

Figure 2:
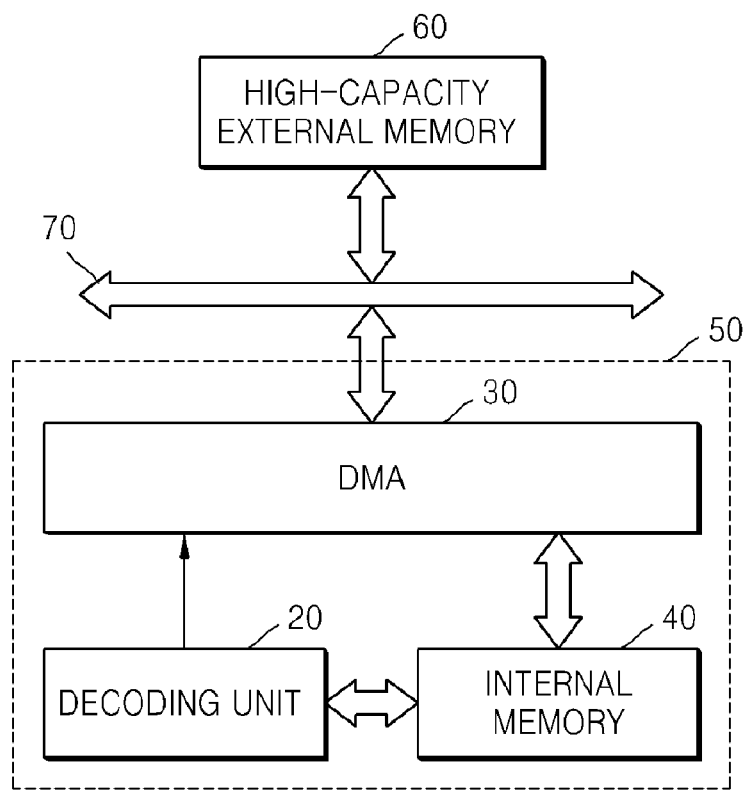
FIG. 2 is a block diagram of an image decoding system including a decoding unit illustrated in FIG. 1, according to an embodiment of the present disclosure.

FIG. 2 is a block diagram of an example image decoding system that includes a decoding unit (e.g., the decoding unit 20 shown in FIG. 1), according to an embodiment of the present disclosure. An image can include various data including a picture, a frame, etc.

Referring to FIG. 2, the image decoding system includes an image decoding apparatus 50, a high-capacity external memory 60, and an external system bus 70 through which data is exchanged between the image decoding apparatus 50 and the high-capacity external memory 60. The image decoding apparatus 50 includes the decoding unit 20, a direct memory access (DMA) apparatus 30, and an internal memory 40.

In general, the decoding unit 20 should process a large amount of data and thus needs access to a high-speed memory. Thus, the image decoding apparatus 50 includes an exclusive high-speed memory, i.e., the internal memory 40 to increase operation speed of the decoding unit 20. Also, data input/output of the decoding unit 20 is performed with respect to the internal memory 40. The DMA apparatus 30 allows the decoding unit 20 to directly access the high-capacity external memory 60 so as to read or write data, independently from a central processing unit (CPU).

The decoding unit 20 controls the DMA apparatus 30 to control data exchange between the high-capacity external memory 60 and the image decoding apparatus 50. When data stored in the high-capacity external memory 60 is needed, the decoding unit 20 controls the DMA apparatus 30 to transfer the data stored in the high-capacity external memory 60 to the internal memory 40. The capacity of the internal memory 40 can be about several hundred kilobytes and thus a large amount of data can be stored in the high-capacity external memory 60.

Data exchange between the image decoding apparatus 50 and the high-capacity external memory 60 through an external bus may depend on a burst size of the external bus.

FIG. 3 is a block diagram of a decoding unit (e.g., decoding unit 20 shown in FIG. 2), according to an embodiment of the present disclosure. Referring to FIG. 3, the decoding unit 20 includes an entropy decoding unit 21, an inverse quantization unit 22, an inverse transformation unit 23, a motion compensation unit 24, an adder 25, and a filter 26. A frame buffer 40 shown in FIG. 3 corresponds to the internal memory 40 shown in FIG. 2.

The entropy decoding unit 21 performs entropy decoding on a bitstream received an image encoding apparatus and thus generates a quantized result of an error image between a current image and a prediction image, and motion compensation information of the current image. An image can include various data including a picture, a frame, etc. The entropy decoding unit 21 sequentially performs entropy decoding on macroblocks of the bitstream. Also, the entropy decoding unit 21 generates a control signal for transmitting a reference image needed to restore the current image from the high-capacity external memory 60 to the frame buffer 40. Further, the entropy decoding unit 21 transmits the control signal to the DMA apparatus 30.

The current image represents an image selected to be currently decoded. The prediction image represents an image obtained when the encoding unit 10 performs inter prediction on the current image. The error image represents a difference between the current image and the prediction image, i.e., information included in the bitstream actually output from the encoding unit 10. Also, the reference image represents an image that matches the current image the most from among previous images restored by the decoding unit 20, i.e., an image to be used to decode the current image. Also, the motion compensation information of the current image represents information generated by the encoding unit 10 and includes, for example, a location value of the reference image, an index, and a motion vector. The quantized result of the error image, which is output from the entropy decoding unit 21, is input to the inverse quantization unit 22 and the inverse transformation unit 23, and the motion compensation information output from the entropy decoding unit 21 is input to the motion compensation unit 24.

The inverse quantization unit 22 inversely quantizes the quantized result generated by the entropy decoding unit 21 and thus restores frequency coefficients of the error image. The inverse transformation unit 23 restores the error image by converting the frequency coefficients restored by the inverse quantization unit 22 from a frequency space into a color space.

The motion compensation unit 24 restores the prediction image by performing motion compensation on the current image based on the motion compensation information restored by the entropy decoding unit 21. The motion compensation unit 24 may receive the reference image from the frame buffer 40 and may restore the prediction image of the current image. Thus, as more time is taken to receive the reference image from the frame buffer 40, more time is taken for an overall decoding operation of the decoding unit 20. Meanwhile, the frame buffer 40 receives the reference image from the high-capacity external memory 60, and the decoding unit 20 receives the reference image from the frame buffer 40. Thus, because a time taken to receive the reference image from the frame buffer 40 varies according to a condition of the external system bus 70, a time taken for the overall decoding operation also varies according to the condition of the external system bus 70.

The adder 25 adds the prediction image restored by the motion compensation unit 24 to the error image restored by the inverse transformation unit 23. The adder 25 may generate the added result as a restored image of the current image, and may store the restored image in the frame buffer 40 or the high-capacity external memory 60.

The filter 26 performs deblocking filtering on the added result of the adder 25 to reduce block distortion in an image output from the adder 25. The filter 26 may selectively perform deblocking filtering on block boundaries and macroblock boundaries or boundaries between macroblocks. The filter 26 may generate the filtered result as a restored image of the current image and may store the restored image in the frame buffer 40. However, in some implementations, the decoding unit 20 may not include the filter 26.

FIG. 4 is a diagram illustrating a conventional decoding operation order. Referring to FIG. 4, according to a conventional decoding method, when an encoded result of a macroblock is input to an encoding unit, initially, an entropy decoding unit performs an entropy decoding operation. After the entropy decoding operation is completed, an inverse quantization unit and an inverse transformation unit respectively perform inverse quantization and inverse transformation operations and a reference image transmitted from an external memory to a DMA apparatus, at the same time. Delay time may occur between the inverse transformation operation and a motion compensation operation according to a time period taken to transmit the reference image. After the reference image is completely transmitted from the external memory, a motion compensation unit and a filter respectively perform motion compensation and deblocking filtering operations.

Figure 5:
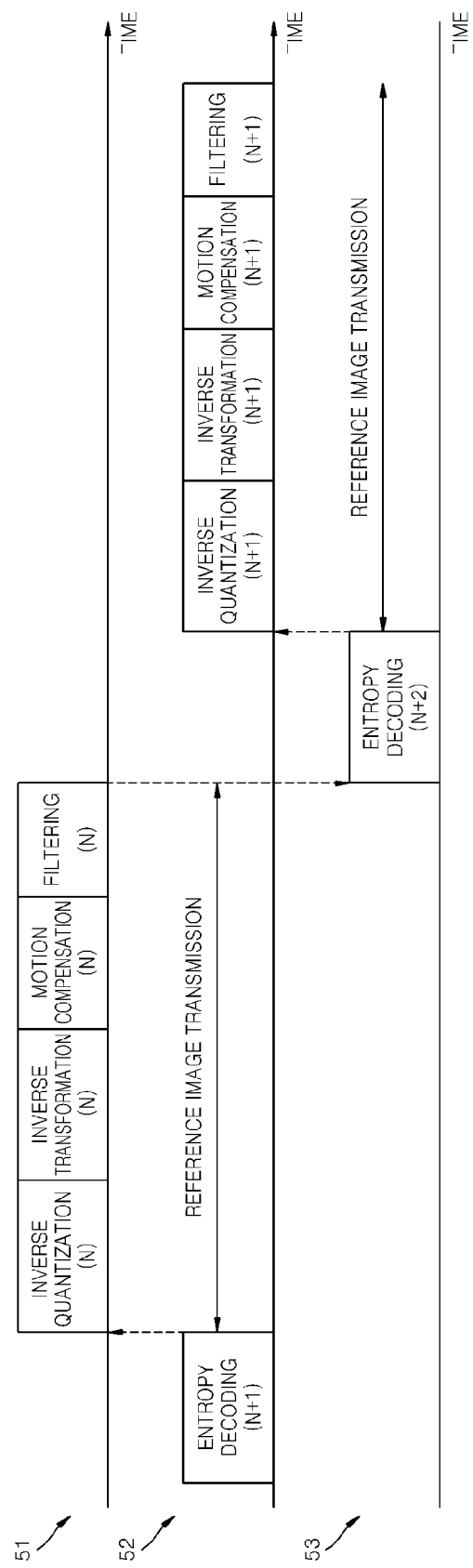
FIG. 5 is a diagram illustrating an order of operations performed by the decoding unit illustrated in FIG. 3, according to an embodiment of the present disclosure.

FIG. 5 is a diagram illustrating an example order of operations performed by a decoding unit (e.g., the decoding unit 20 shown in FIG. 3), according to an embodiment of the present disclosure. Referring to FIGS. 2, 3, and 5, the decoding unit 20 performs an entropy decoding operation to be performed by the entropy decoding unit 21 and an image restoring operation to be performed by the inverse quantization unit 22, the inverse transformation unit 23, the motion compensation unit 24, and the filter 26 with a time difference. Reference numeral 51 represents a decoding operation order of an Nth macroblock, i.e., a previous image, reference numeral 52 represents the decoding operation order of an (N+1)th macroblock, i.e., a current image, and reference numeral 53 represents the decoding operation order of an (N+2)th macroblock, i.e., a subsequent image. Here, N is a natural number. Also, in FIG. 5, a dotted arrow represents a processing order of an operation.

When the entropy decoding operation is performed on the (N+1)th macroblock, the image restoring operation including inverse quantization, inverse transformation, motion compensation, and filtering operations are performed on the Nth macroblock while a reference image needed to perform the motion compensation operation on the (N+1)th macroblock is being transmitted. The reference image is transmitted from the high-capacity external memory 60 to the internal memory 40 by the DMA apparatus 30. The motion compensation operation is performed on the Nth macroblock by using the reference image transmitted before the entropy decoding operation is performed on the (N+1)th macroblock, and thus an additional delay time does not occur.

When the image restoring operation is completely performed on the Nth macroblock, the entropy decoding operation is performed on the (N+2)th macroblock. When the entropy decoding operation is completely performed on the (N+2)th macroblock, the image restoring operation including the inverse quantization, inverse transformation, motion compensation, and filtering operations are performed on the (N+1)th macroblock, i.e., a current block, while the reference image needed to perform the motion compensation operation on the (N+2)th macroblock is being transmitted. The motion compensation operation is performed on the (N+1)th macroblock by using the reference image transmitted in advance, and thus an additional delay time does not occur.

In other words, the decoding unit 20 performs the entropy decoding operation on a current macroblock, and then performs the image restoring operation on a previous macroblock while the reference image needed to perform the motion compensation operation on the current macroblock is being transmitted. Also, when the image restoring operation is completely performed on the previous macroblock, the entropy decoding operation is performed on a subsequent macroblock, and then the image restoring operation is performed on the current macroblock while the reference image required to perform the motion compensation operation on the subsequent macroblock is being transmitted.

According to an embodiment of the present disclosure, the reference image of the (N+1)th macroblock may be completely transmitted while the image restoring operation is performed on the Nth macroblock. Also, according to another embodiment of the present disclosure, the reference image of the (N+1)th macroblock may be transmitted before the motion compensation operation is performed on the (N+1)th macroblock that actually needs the reference image (for example, when the reference image of the (N+1)th macroblock has a large amount of data). While the image restoring operation on the Nth macroblock, the entropy decoding operation on the (N+2)th macroblock, and the inverse quantization and inverse transformation operations on the (N+1)th macroblock during the image restoring operation on the (N+1)th macroblock are being performed, the reference image of the (N+1)th macroblock may be transmitted.

However, according to another embodiment of the present disclosure, in some cases, operations on multiple previous images have to be simultaneously performed in order to reduce data transmission delay according to transmission performance of the DMA apparatus 30. Thus, the previous macroblock, the current macroblock, and the subsequent macroblock may be varied into Nth, (N+2)th, and (N+4)th macroblocks or Nth, (N+3)th, and (N+6)th macroblocks instead of the Nth, (N+1)th, and (N+2)th macroblocks.

According to another embodiment of the present disclosure, after the entropy decoding, inverse quantization, inverse transformation operations are performed on the current macroblock, the motion compensation operation may be performed on the previous macroblock while the reference image needed to perform the motion compensation operation on the current macroblock is being transmitted. Also, when the reference image needed to perform the motion compensation operation on the current macroblock is completely transmitted, the entropy decoding, inverse quantization, inverse transformation operations are performed on the subsequent macroblock, and then the motion compensation operation may be performed on the current macroblock while the reference image required to perform the motion compensation operation on the subsequent macroblock is being transmitted.

Figure 6:
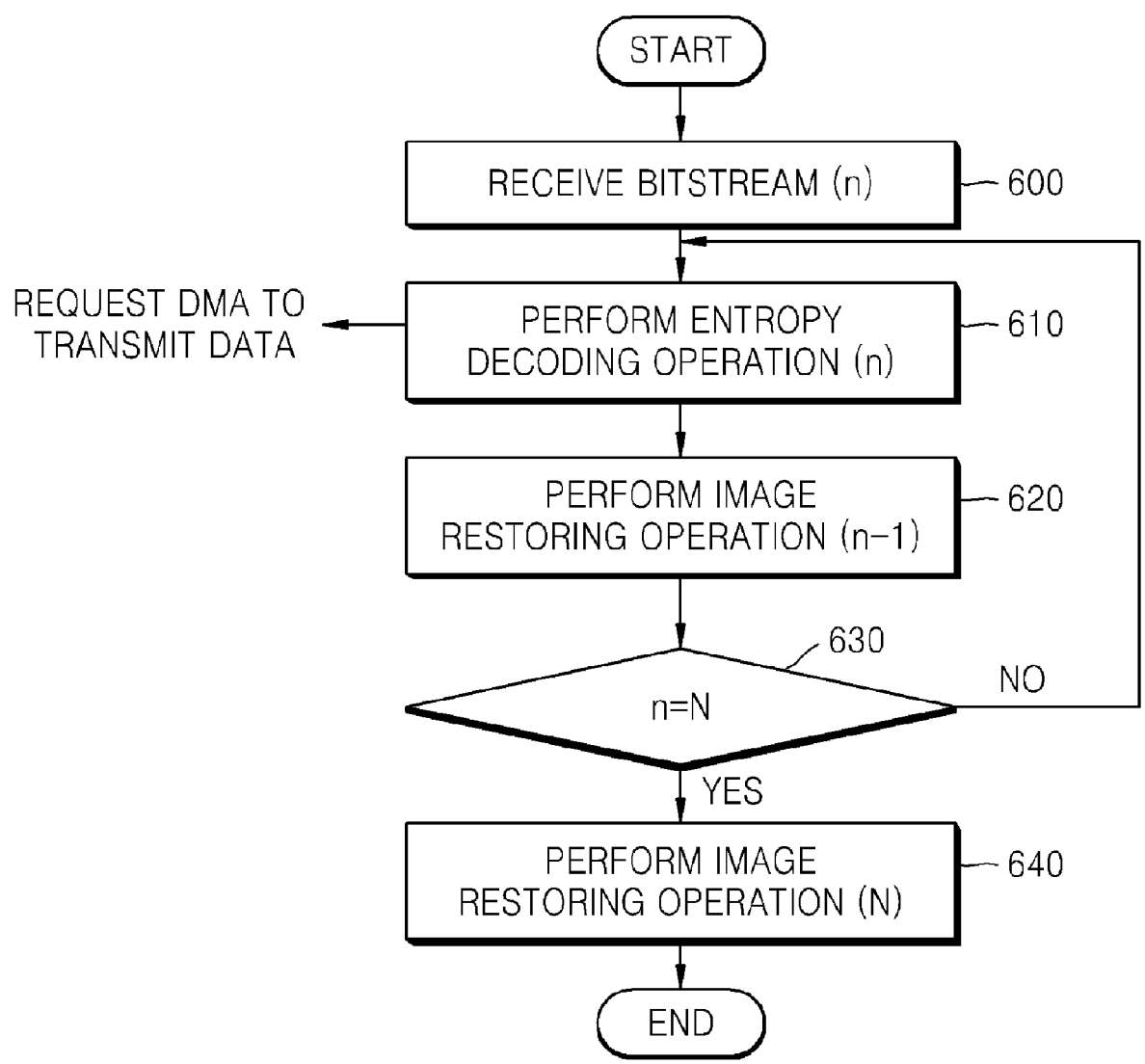
FIG. 6 is a flowchart illustrating an image decoding method according to an embodiment of the present disclosure.

For example, when an 720×480 image of 1.5 megabits per second (Mbps) is reproduced to 30 frames per second (fps), When a transmission delay due to the DMA apparatus 30 does not occur, the image decoding system may operate at 154 megahertz (MHz). When the external system bus 70 is exclusively used by the image decoding apparatus 50, the image decoding system has to operate at high speed of about 180.3 MHz according to a conventional decoding method but may reproduce an image even when operating at low speed of about 157.8 MHz according to an embodiment of the present disclosure. When the image decoding apparatus 50 shares the external system bus 70 with another apparatus such as a display apparatus, the image decoding system should operate at high speed of about 214.5 MHz according to the conventional decoding method but may reproduce an image even when operating at low speed of about 187.6 MHz according to an embodiment of the present disclosure FIG. 6 is a flowchart illustrating an example image decoding method according to an embodiment of the present disclosure. The image decoded can include various data including a picture, a frame, etc. The image decoding method described with respect to FIG. 6 corresponds to the time series operations described above by using the image decoding system illustrated in FIG. 2 and thus detailed descriptions thereof will not be provided.

Referring to FIG. 6, a decoding unit (e.g., the decoding unit 20 illustrated in FIG. 2) receives a bitstream of an nth macroblock (600). Here, n is a natural number. The decoding unit 20 may initially receive the bitstream of a first macroblock (n=1).

The decoding unit 20 performs entropy decoding on the bitstream of the nth macroblock (610). When entropy decoding is completely performed, the decoding unit 20 requests the DMA apparatus 30 illustrated in FIG. 2 to transmit data corresponding to a reference image.

The decoding unit 20 performs an image restoring operation on an (N−1)th macroblock (620). The image restoring operation corresponds to inverse quantization, inverse transformation, motion compensation, and deblocking filtering.

The decoding unit 20 determines whether n matches N, i.e., the number of macroblocks (630). When n does not match N, the method returns to 610. When n matches N, the method proceeds to 640.

The decoding unit 20 performs the image restoring operation on an Nth macroblock (640). The image restoring operation corresponds to inverse quantization, inverse transformation, motion compensation, and deblocking filtering.

Figure 7:
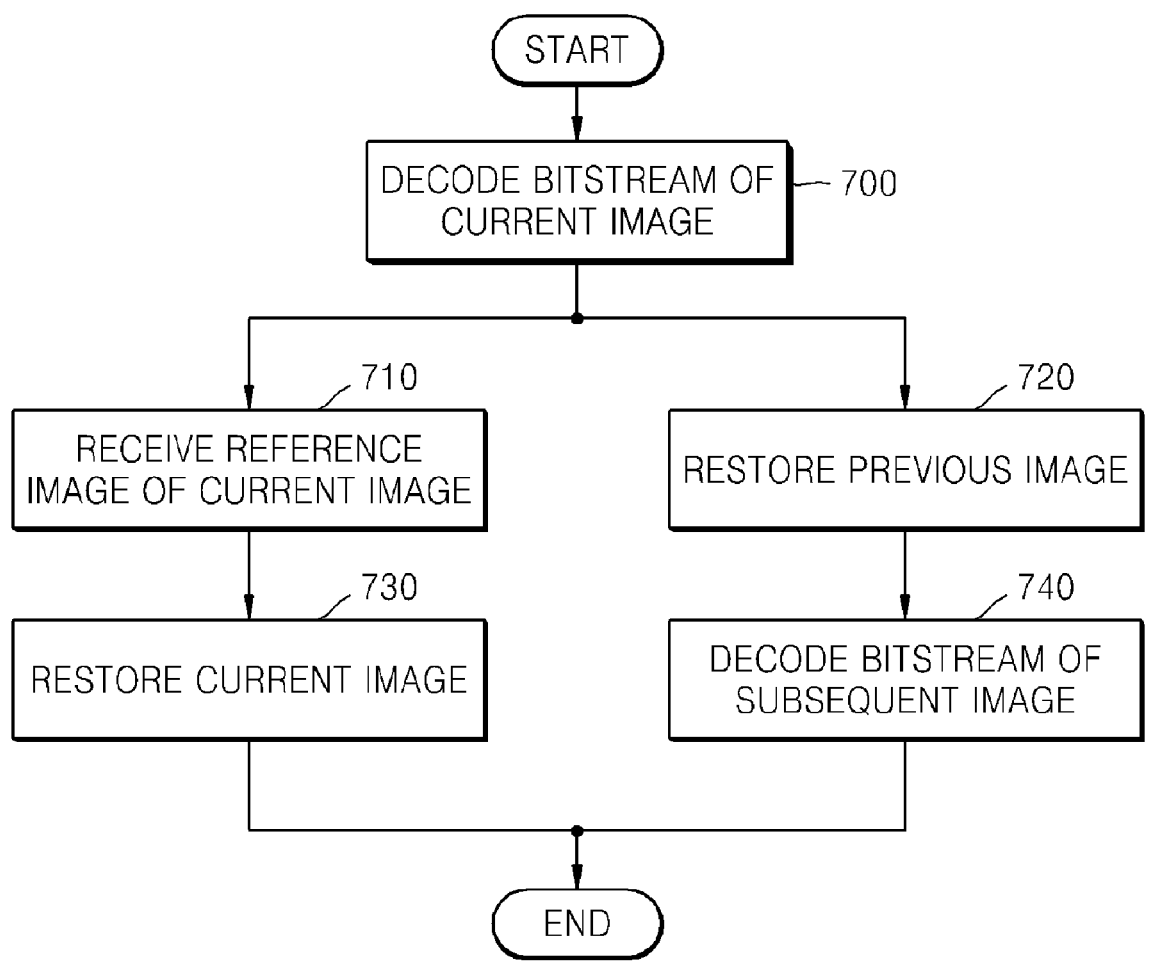
FIG. 7 is a flowchart illustrating an image decoding method according to another embodiment of the present disclosure.

FIG. 7 is a flowchart illustrating an example image decoding method according to another embodiment of the present disclosure. An image decoded can include various data including a picture, a frame, etc. The image decoding method described with respect to FIG. 7 corresponds to the time series operations described above by using the image decoding system illustrated in FIG. 2 and thus detailed descriptions thereof will not be provided.

Referring to FIG. 7, a decoding unit (e.g., decoding unit 20) generates motion compensation information and a quantized result of an error image between a current image and a prediction image from a bitstream of the current image (700).

The decoding unit receives a reference image of the current image by using the motion compensation information (710). While the reference image of the current image is being received, the decoding unit restores a previous image (720). Operations 710 and 720 may be performed simultaneously or with a predetermined temporal gap between them.

The decoding unit restores the current image based on the received reference image and the quantized result (730). While the current image is being restored, the decoding unit receives the reference image of a subsequent image (740). Alternatively, in 740, while the current image is being restored, the decoding unit can generate the motion compensation information and the quantized result of the error image between the current image and the prediction image from the bitstream of the subsequent image. Operations 730 and 740 may be performed simultaneously or with a predetermined temporal gap between them.

FIG. 8 is a flowchart illustrating an example data transmission control method according to an embodiment of the present disclosure. The data transmission control method relates to data transmission between an image decoding apparatus and an external memory and corresponds to the time series operations described above by using the image decoding system illustrated in FIG. 2 and thus detailed descriptions thereof will not be provided.

Referring to FIG. 8, an image decoding apparatus (e.g., an image decoding apparatus 50) requests an external memory (e.g., high-capacity external memory 60) to transmit data corresponding to a reference image of a current image by using motion compensation information of the current image generated by the image decoding apparatus. An image can include various data including a picture, a frame, etc. (800).

The image decoding apparatus receives the data corresponding to the reference image of the current image transmitted from the external memory (810).

The image decoding apparatus performs an image restoring operation on a previous image. Operations 810 and 820 may be performed simultaneously or with a predetermined temporal gap between them.

While the present disclosure has been particularly shown and described by using exemplary embodiments thereof, it will be understood by one of ordinary skill in the art that various changes in form and details may be made therein without departing from the spirit and scope of the disclosure as defined by the following claims and their equivalents. Also, the disclosure can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion.

As described above, according to the present disclosure, delay time of an overall decoding operation may be reduced by generating motion compensation information and a quantized result of an error image between a current image and a prediction image from a bitstream of the current image, receiving a reference image from an external memory by using the motion compensation information while a previous image is being restored, and restoring the current image based on the received reference image and the quantized result while the reference image of a subsequent image is being received.

While this specification contains many specifics, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Only a few implementations and examples are described and other implementations, enhancements and variations can be made based on what is described and illustrated in this application.

What is claimed is:

1. A method performed by an image decoding apparatus, comprising:

generating motion compensation information and a quantized result of an error image that represents a difference between one image among a current image, a previous image and a subsequent image to be restored and a prediction image obtained by performing inter prediction on the corresponding image from a bitstream of the corresponding image;

receiving a reference image of the current image from an external memory unit by using the generated motion compensation information, while the previous image is being restored; and restoring the current image based on the received reference image of the current image and the generated quantized result of the error image, while a reference image of the subsequent image from the external memory is being received, wherein each reference image is needed to perform motion compensation operation of the current image, the previous image and the subsequent image, respectively.

2. The method of claim 1, wherein receiving the reference image of the current image comprises:
   requesting a direct memory access (DMA) apparatus to transmit the reference image of the current image from the external memory unit using an external system bus based on the generated motion compensation information; and
   receiving the reference image of the current image from the external memory unit and storing the reference image of the current image into an internal memory unit.

3. The method of claim 1, wherein restoring the current image comprises:
   restoring the error image by inversely quantizing the generated quantized result and inversely transforming the inversely quantized result from a frequency space into a color space;
   restoring the prediction image by performing motion compensation on the current image based on the received reference image; and
   adding the restored error image to the restored prediction image.

4. The method of claim 3, wherein restoring the current image further comprises performing deblocking filtering on a result of the adding and outputting a result of filtering as the restored current image.

5. The method of claim 1, wherein at least the current image corresponds to one or more blocks of a predetermined size, and
   wherein generating the motion compensation information and the quantized result, receiving the reference image of the current image, and restoring the current image are performed a number of times corresponding to a number of the one or more blocks.

6. A non-transitory computer readable medium embodied with instructions to cause a data processing apparatus to perform an image decoding method comprising:
   generating motion compensation information and a quantized result of an error image that represents a difference between one image among a current image, a previous image and subsequent image to be restored and a prediction image obtained by performing inter prediction on the corresponding image from a bitstream of the corresponding image;
   receiving a reference image of the current image from an external memory unit by using the generated motion compensation information, while the previous image is being restored; and
   restoring the current image based on the received reference image of the current image and the generated quantized result of the error image, while a reference image of the subsequent image from the external memory is being received,
   wherein each reference image is needed to perform motion compensation operation of the current image, the previous image and the subsequent image, respectively.

7. The computer readable medium of claim 6, wherein receiving the reference image of the current image comprises:
   requesting a direct memory access (DMA) apparatus to transmit the reference image of the current image from the external memory unit using an external system bus based on the generated motion compensation information; and
   receiving the reference image of the current image from the external memory unit and storing the reference image of the current image into an internal memory unit.

8. The computer readable medium of claim 6, wherein restoring the current image comprises:
   restoring the error image by inversely quantizing the generated quantized result and inversely transforming the inversely quantized result from a frequency space into a color space;
   restoring the prediction image by performing motion compensation on the current image based on the received reference image; and
   adding the restored error image to the restored prediction image.

9. The computer readable medium of claim 8, wherein restoring the current image further comprises performing deblocking filtering on a result of the adding and outputting a result of filtering as the restored current image.

10. The computer readable medium of claim 9, wherein at least the current image corresponds to one or more blocks of a predetermined size, and
    wherein generating the motion compensation information and the quantized result, receiving the reference image of the current image, and restoring the current image are performed a number of times corresponding to a number of the one or more blocks.

11. An image decoding apparatus comprising:
    an entropy decoding unit to generate motion compensation information and a quantized result of an error image representing a difference between one image among a current image, a previous image and a subsequent image to be restored and a prediction image obtained by performing inter prediction on the corresponding image by performing entropy decoding on a bitstream that is an encoded result of the corresponding image; and
    an image restoring unit to receive a reference image of the current image from an external memory unit by using the generated motion compensation information and to restore the current image based on the received reference image and the quantized result,
    wherein the image restoring unit is configured to restore the previous image while receiving the reference image of the current image, and receive the reference image of the subsequent image while restoring the current image,
    wherein each reference image is needed to perform motion compensation operation of the current image, the previous image and the subsequent image, respectively.

12. The image decoding apparatus of claim 11, wherein the image restoring unit is configured to receive the reference image from the external memory unit using an external system bus by using the generated motion compensation information.

13. The image decoding apparatus of claim 11, wherein the image restoring unit comprises:
    an inverse quantization unit to inversely quantize the quantized result;
    an inverse transformation unit to restore the error image by inversely transforming the inversely quantized result from a frequency space into a color space;
    a motion compensation unit to restore the prediction image by performing motion compensation on the current image based on the received reference image; and
    an adder to add the restored error image and the restored prediction image.

14. The image decoding apparatus of claim 13, wherein the image restoring unit further comprises a deblocking filter to perform deblocking filtering on a result of the adder and output a result of the deblocking filtered as the restored current image.

15. The image decoding apparatus of claim 11, wherein at least the current image corresponds to one or more blocks of a predetermined size.

16. An image decoding system comprising:
a memory unit to store reference images; and
an image decoding apparatus to communicate with the memory unit to
generate motion compensation information and a quantized result of an error image representing a difference between one image among a current image, a previous image and a subsequent image to be restored and a prediction image obtained by performing inter prediction on the corresponding image by performing entropy decoding on a bitstream of the corresponding image,
receive at least one of the reference images from the memory unit for the current image by using the generated motion compensation information, and
restore the current image based on the at least one received reference image and the quantized result, while receiving a reference image of the subsequent image from the memory unit,
wherein the image decoding apparatus is configured to
request the memory unit to transmit the at least one of the reference images by using the motion compensation information, and
receive the at least one of the reference images from the memory unit while restoring the previous image,
and wherein the at least one of the reference images is needed to perform motion compensation operation.

17. The image decoding system of claim 16, wherein the image decoding apparatus comprises:

an entropy decoding unit to generate the motion compensation information and the quantized result by performing entropy decoding on a bitstream comprising an encoded result of the current image;
an inverse quantization unit to inversely quantize the quantized result;
an inverse transformation unit to restore the error image by inversely transforming the inversely quantized result from a frequency space into a color space;
a motion compensation unit to restore the prediction image by performing motion compensation on the current image based on the at least one received reference image; and
an adder to add the restored error image and the restored prediction image.

18. The image decoding system of claim 16, wherein the image decoding apparatus further comprises a deblocking filter to perform deblocking filtering on a result of the adder and output a result of the deblocking filter as the restored current image.

19. The image decoding system of claim 16, wherein at least the current image corresponds to one or more blocks of a predetermined size.

20. The image decoding system of claim 16, comprising a system bus connected between the memory unit and the image decoding apparatus, wherein the image decoding apparatus is configured to receive at least one of the reference images from the memory unit using the system bus.

* * * * *